United States Patent
Tomkow et al.

(10) Patent No.: US 11,665,120 B2
(45) Date of Patent: May 30, 2023

(54) IDENTIFYING HTTP REQUESTS GENERATED FROM LINKS EMBEDDED IN EMAILS BY AUTOMATED PROCESSES

(71) Applicants: Terrance Tomkow, Los Angeles, CA (US); Zafar Khan, Redondo Beach, CA (US)

(72) Inventors: Terrance Tomkow, Los Angeles, CA (US); Zafar Khan, Redondo Beach, CA (US)

( * ) Notice: Subject to any disclaimer, the term of this patent is extended or adjusted under 35 U.S.C. 154(b) by 0 days.

(21) Appl. No.: 17/663,425

(22) Filed: May 14, 2022

(65) Prior Publication Data
US 2022/0368662 A1  Nov. 17, 2022

Related U.S. Application Data

(60) Provisional application No. 63/201,857, filed on May 15, 2021.

(51) Int. Cl.
*H04L 51/21* (2022.01)
*H04L 9/40* (2022.01)
*H04L 67/02* (2022.01)
*H04L 51/42* (2022.01)

(52) U.S. Cl.
CPC .............. *H04L 51/21* (2022.05); *H04L 51/42* (2022.05); *H04L 63/0236* (2013.01); *H04L 67/02* (2013.01)

(58) Field of Classification Search
CPC ..... H04L 51/21; H04L 51/42; H04L 63/0236; H04L 67/02
See application file for complete search history.

(56) References Cited

U.S. PATENT DOCUMENTS

| | | | |
|---|---|---|---|
| 10,880,322 B1* | 12/2020 | Jakobsson | H04L 51/08 |
| 2012/0072500 A1* | 3/2012 | Greene | G06F 16/162 |
| | | | 709/206 |
| 2021/0314269 A1* | 10/2021 | Stewart | H04L 47/28 |

* cited by examiner

*Primary Examiner* — Cheikh T Ndiaye
(74) *Attorney, Agent, or Firm* — Fitzgerald IP Law; John K. Fitzgerald, Esq.

(57) ABSTRACT

Systems and methods for identifying HTTP requests generated from links embedded in emails and determining if those HTTP requests were generated by a human or a non-human are disclosed.

15 Claims, 7 Drawing Sheets

IDENTIFYING HTTP REQUESTS GENERATED FROM LINKS EMBEDDED IN EMAILS BY AUTOMATED PROCESSES

BACKGROUND

Email messages sent in HTML format can include elements that generate requests to remote web servers when the messages are opened in a user's browser or when the user interacts with some element of the browser.

Monitoring these requests at the remote server can record these requests. This information can be useful for many purposes; e.g. determining whether an email recipient has opened a message or assessing the success of an email marketing campaign.

However, because embedded links can be used to link to websites that download malware, systems have been created to automatically generate HTTP requests from links embedded in the email before delivering them to users, to screen malicious content. While these systems provide security for email recipients, they rob the evidentiary and information-driven business process value of monitoring these requests as a means of determining user engagement.

What has been needed but not heretofore been available is a system and method for providing a means whereby requests generated by these automated screening systems (auto-clicks) can be distinguished from those generated by human interaction. The present disclosure satisfies these and other needs.

SUMMARY OF THE INVENTION

In its most general aspect, the disclosure includes a system and method for providing a means whereby requests generated by these automated screening systems (auto-clicks) can be distinguished from those generated by human interaction.

In another general aspect, the disclosure describes a method for identifying HTTP requests generated by user interaction with links embedded in emails from requests generated by automated processes comprising: a system serving as a Mail Transport Agent capable of receiving email messages for transmission to remote destinations, a web server capable of receiving HTTP requests at an internet address, coupled with a database containing a list of Internet Protocol (IP) addresses of automated systems that generate HTTP requests from links included in email messages, at the MTA server, the step of determining the domain of a message's destination address and, before transmitting the message to the destination, creating a test message to a fictitious address in the destination domain and embedding in said message a link to the web server; and transmitting said message to the fictitious address, and the web server, upon receiving HTTP requests, determining the IP address of the originating message and adding that address to the database list of addresses of automated systems generating HTTP requests. In another aspect, at the Web server, after identifying the originating address of an HTTP request, determining the ownership of said IP address and further identifying IP addresses associated with said owner and adding said addresses to the database.

In another general aspect, the disclosure describes a system of receiving a message at an MTA server, at the MTA server determining the domain of a message's destination address and, before transmitting the message to the destination, creating a test message to a fictitious address in the destination domain and embedding in said message a link to a web server; and transmitting said message to the fictitious address, and the web server, upon receiving HTTP requests, determining the IP address of the originating message destination and adding that address to the database list of addresses of automated systems generating HTTP requests. In another aspect, at the Web server, after identifying the originating address of an HTTP request, determining the ownership of said IP address and further identifying IP addresses associated with said owner and adding said addresses to the database.

In yet another aspect, the present disclosure describes a system for identifying HTTP requests generated by user interaction with links embedded in emails from requests generated by automated processes comprising: a system serving as a Mail Transport Agent (MTA) capable of receiving email messages for transmission to remote destinations; a web server having a processor programmed using hardware and/or software commands the processor configured to receive HTTP requests at an internet address, the web server processor coupled with a database containing a list of Internet Protocol (IP) addresses of automated systems that generate HTTP requests from links included in email messages; wherein, the processor of the MTA server determines the domain of a message's destination address and, before transmitting the message to the destination, creates a test message to a fictitious address in the destination domain and embeds in the message a link in the test message and transmits the test message to the fictitious address; and wherein at the web server, upon receiving HTTP requests, the processor determines from the response to the text message that the IP address of the originating message is non-human and adds that address to the database list of addresses of automated systems generating HTTP requests. In an alternative aspect, the processor of the MTA server identifies the originating address of an HTTP request, determines an ownership of the IP address and further identifies the IP address or addresses associated with the owner and adds the address or addresses to the database.

In still another aspect, the present disclosure describes a system for receiving a message at an MTA server, comprising: a processor located at the MTA server, the processor programmed using hardware and/or software programming commands to determine the domain of a message's destination address; wherein, before transmitting the message to an intended destination of the received message, the processor creates a test message to a fictitious address in the destination domain, embeds a link to a web server in the message, and transmits the test message to the fictitious address; and wherein the processor at the web server, upon receiving an HTTP requests for the fictitious address, determines the IP address of the originating message, and adds that address to a database list of addresses of automated systems generating HTTP requests. In another aspect, the system, after identifying the originating address of the HTTP request, the processor of the MTA server determines an owner of the IP address and further identifies IP addresses associated with the owner and adds those addresses to the database.

In yet another aspect, the disclosure describes a system for identifying HTTP requests generated by user interaction with links embedded in emails from requests generated by automated processes comprising: a system serving as a Mail Transport Agent capable of receiving email messages for transmission to remote destinations; a web server capable of receiving HTTP requests at an internet address, coupled with a database of parameters and an analyzer that uses those parameters to make a determination as to whether the data returned associated with the HTTP request includes indicators that the HTTP request was not initiated by a server associated with the recipient destination. In one other aspect, the indicators are in the HTTP records and include information identifying email clients at the recipient. In another aspect, the analyzer may measure time sequence of information it receives related to the HTTP request. In yet another aspect, the analyzer makes a determination that the HTTP request was not initiated by a server associated with the recipient destination using information related to the difference between the time of sending by the server, time of receiving the HTTP request information, and a minimum permitted difference parameter. In still another aspect, the analyzer further determines if subsequent information is returned to the server that would indicate that the HTTP request was initiated by a server associated with the recipient destination. In yet another aspect, the result of the analyzer is retained in a report. In another aspect, the report is authenticatable. In still another aspect, the report is made accessible to the message sender. In still another aspect, the analyzer matches an MX record in the database to verify if the click/IP is associated with the MX record in the database. In yet another aspect, the analyzer further determines if there is an additional click/IP record at a different location and records the determination in a database associated with the analyzer. In yet another aspect, the result of the analyzer is retained in a report.

Other features and advantages of the present disclosure will become apparent from the following detailed description, taken in conjunction with the accompanying drawings, which illustrate, by way of example, the principles of the disclosure.

BRIEF DESCRIPTION OF THE DRAWINGS

The drawings accompanying and forming part of this specification are included to depict certain aspects of the disclosure. A clearer impression of the various embodiments of the disclosure, and of the components and operation of systems provided within the disclosure, will become more readily apparent by referring to the exemplary, and therefore nonlimiting, embodiments illustrated in the drawings, wherein identical reference numerals designate the same components.

DETAILED DESCRIPTION OF THE PREFERRED EMBODIMENTS

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Detailed descriptions of known natural language processing techniques, computer software, hardware, operating platforms, and protocols are omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
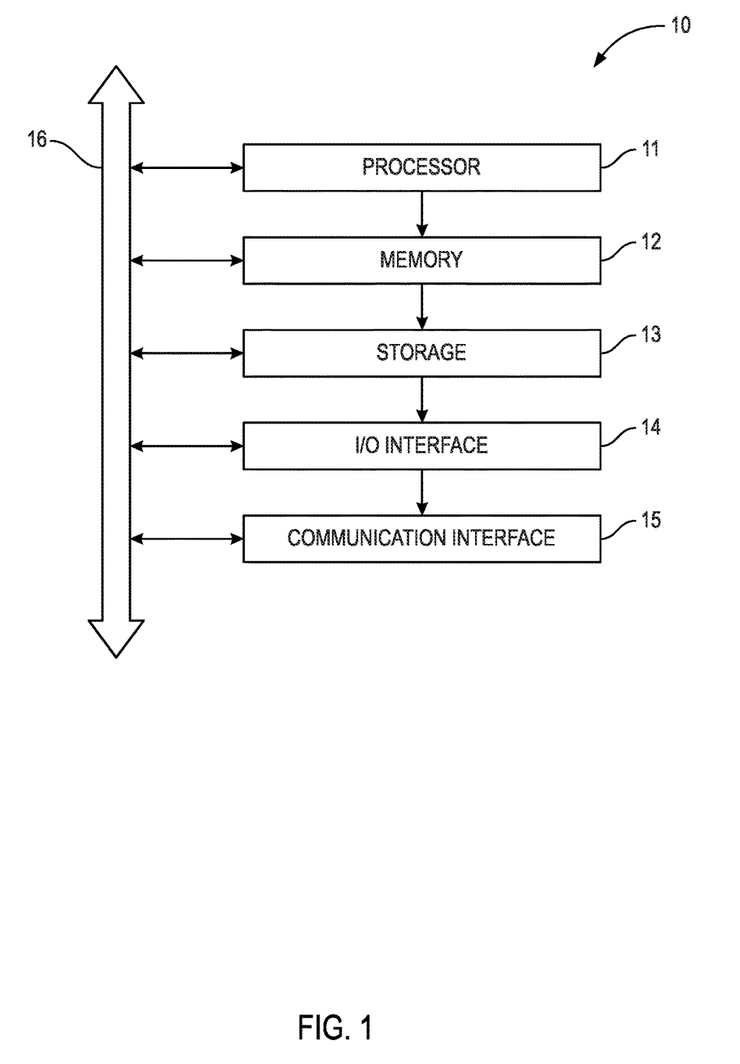
FIG. 1 is a schematic diagram of a computer or processing system that may be specifically modified by the various embodiments of the present disclosure.

FIG. 1 illustrates an exemplary computer system 10 which may be used with some embodiments of the present disclosure, which may be, for example, a server or a client computer system. Computer system 10 may take any suitable form, including but not limited to an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 10 may be a combination of multiple forms. Computer system 500 may include one or more computer systems 10, be unitary or distributed spanning multiple locations, spanning multiple systems, or residing in a cloud (which may include one or more cloud components in one or more networks).

In one embodiment, computer system 10 may include one or more processors 11, memory 12, storage 13, an input/output (I/O) interface 14, a communication interface 15, and a bus 16. Although this disclosure describes and illustrates a particular computer system having a particular number of particular components in a particular arrangement, this disclosure contemplates other forms of computer systems having any suitable number of components in any suitable arrangement.

In one embodiment, processor 11 includes hardware for executing instructions, such as those making up software. Herein, reference to software may encompass one or more applications, byte code, one or more computer programs, one or more executable modules or API, one or more instructions, logic, machine code, one or more scripts, or source code, and or the like, where appropriate. As an example and not by way of limitation, to execute instructions, processor 11 may retrieve the instructions from an internal register, an internal cache, memory 12 or storage 13; decode and execute them; and then write one or more results to an internal register, an internal cache, memory 12, or storage 13. In one embodiment, processor 11 may include one or more internal caches for data, instructions, or addresses. Memory 13 may be random access memory (RAM), static RAM, dynamic RAM, or any other suitable memory. Storage 15 may be a hard drive, a floppy disk drive, flash memory, an optical disk, magnetic tape, or any other form of storage device that can store data (including instructions for execution by a processor).

In one embodiment, storage 13 may be mass storage for data or instructions which may include, but not limited to, a Hard Disk Drive (HDD), Solid-State Drive (SSD), disk drive, flash memory, an optical disc (such as a DVD, CD, Blu-ray, and the like), magneto-optical disc, magnetic tape, or any other hardware device which stores computer-readable media, data and/or combinations thereof. Storage 13 maybe be internal or external to computer system 10.

In one embodiment, input/output (I/O) interface 304 includes hardware, software, or both for providing one or more interfaces for communication between computer system 10 and one or more I/O devices. Computer system 10 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpads, biometric input device or sensor, or the like.

In still another embodiment, a communication interface 15 includes hardware, software, or both providing one or more interfaces for communication between one or more computer systems or one or more networks. Communication interface 15 may include a network interface controller (NIC) or a network adapter for communicating with an Ethernet or other wired-based network or a wireless NIC or wireless adapter for communications with a wireless network, such as a Wi-Fi network. In one embodiment, bus 16 includes any hardware, software, or both, coupling components of a computer system 10 to each other.

Figure 2:
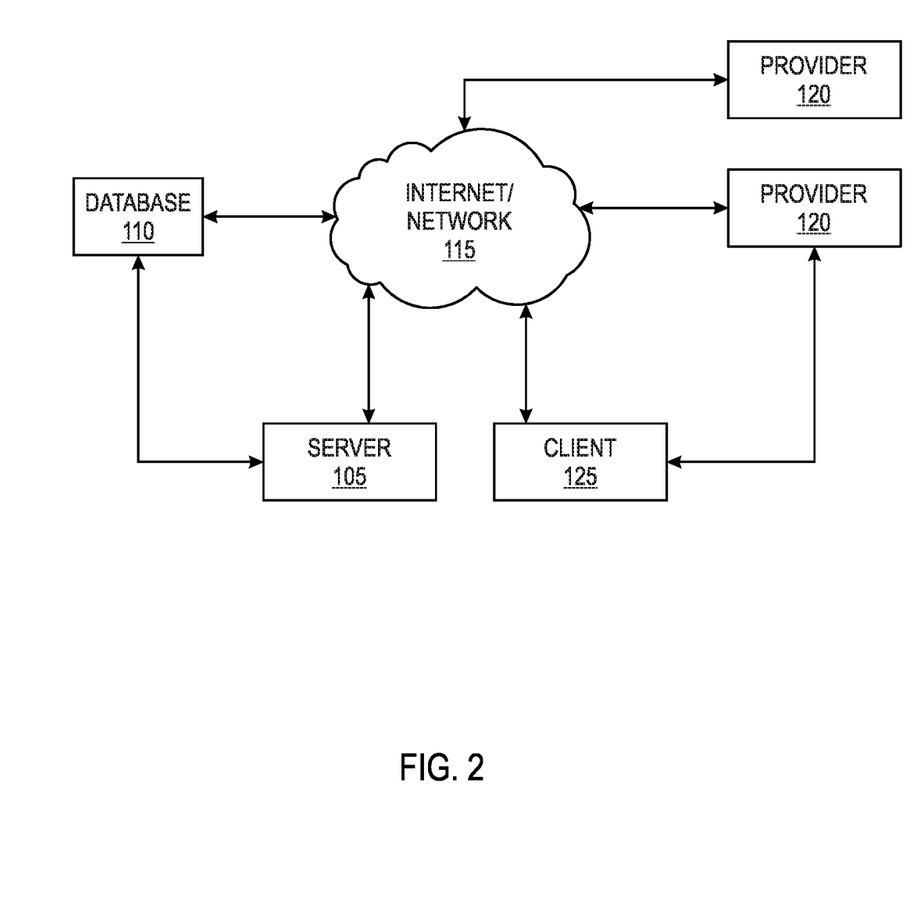
FIG. 2 is a schematic diagram of a network used in accordance with the various embodiments of the disclosure.

FIG. 2 is a graphical representation of an exemplary network 20 that may be used to facilitate the various embodiments of the present disclosure. Server 25 is operated by a services organization, and typically includes at least one processor, input and output equipment or devices, memory, storage, and a communication interface, as discussed above with regards to FIG. 1. The server also operates under the control of specialized software programming commands that are designed to carry out the various processes described above. It should be understood that while the exemplary network 20 is described in terms of a server operated by a services organization, the server could be operated by a third party hired by the services organization or under the control of the services organization. The server could also be operated by a third party independent of the services organization, which then provides information and/or data to the services organization from which the services organization may provide services to a client of the services organization.

A data storage device 30, which may be separate from the server, but not necessarily, may be accessible to the server 25, and may be used for storing data related to information and any other data related to operation of the various embodiments of the system and method described above. The data storage device 30 may be directly connected to the server, or it may be accessible to the server through a network or the Internet 35. The data storage device may also be a virtual storage device or memory located in the Cloud. Also connected through the network or the Internet 35 are one or more providers 40 or a client 45.

From the above, while it may be apparent that the various embodiments disclosed herein may be implemented by computers, servers, or other processors that appear to be organized in a conventional distributed processing system architecture, the various embodiments disclosed herein are not conventional because they bridge multiple remote information sources, such as legacy computer applications, legacy storage media and data resident on workstation storage, media, and also involve sophisticated analysis of various parts of an email message, as well as the methods, protocols, and communication pathways used to transmit and receive the email message. When the various embodiments of this disclosure are operated using computers, servers, and processors, those embodiments transform those computers, servers, and processors into specially programmed computers, servers, and processors in a way that improves not only the operation of the various hardware and software components of the system, but also significantly improve the transmission, receipt, and processing of email messages.

Those of skill will appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the disclosure. In addition, the grouping of functions within a module, block or step is for ease of description. Specific functions or steps can be moved from one module or block without departing from the disclosure.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, do not refer to the action and processes of a general purpose computer system, or similar electronic computing device. Rather, in the context of the below description, such terms relate to processes carried out by a computer or similar electronic computing device that manipulates and transforms data represented as physical (electronic) quantities within the computer system's registers and memories into other data similarly represented as physical quantities within the computer system memories or registers, or other such information storage, transmission or display devices, under the control of embedded or software programming commands specifically designed to carry out the specific functions of the various embodiments of the disclosure.

In an embodiment, the logic consists of electronic circuits that follow the rules of Boolean Logic, software that contain patterns of instructions, or any combination of both.

The term "server" is used throughout the following description. Those skilled in the art understand that a server is a computer program that provides services to other computer programs running on the same computer or processor as the server application is running, and/or other computers or processors different from the computer or processor on which the server is running. Often, the computer or processor on which the server program is running is referred to as the server, although other programs and applications may also be running on the same computer or processor. It will be understood that a server forms part of the server/client model. As such, the processor running the server program may also be a client, requesting services from other programs, and also operate as a server to provide services to other programs upon request. It is understood that the computer or processor upon which a server program is running may access other resources, such as memory, storage media, input/output devices, communication modules and the like.

Similarly, a cloud server is a server that provides shared services to various clients that access the cloud server through a network, such as a local area network and the Internet. In a cloud based system, the server is remote from the clients, and various clients share the resources of the cloud server. Information is passed to the server by the client, and returned back to the client through the network, usually the Internet.

Email marketers sending promotional email on behalf of their clients or business owners report to their clients/ business team the percentage of emails sent for marketing purposes that were opened and percentage that have had a link clicked. This tracking has become essential for email marketers to measure the success or engagement related to email campaigns.

Those sending newsletters by email, likewise, look to identify their active followers or readers, and measure engagement, by understanding the percentage of emails sent that have been tracked as opened and percentage that have had a link clicked.

Today, a common mechanism to track email opening on the Internet has been to put an image or an image the size of a pixel (also known as a web bug) in an email before sending, the image/pixel hosted on a server, and embedded in the email as a link that when activated, calls the server to display the image/pixel in the email at the receiver. When the server hosting the image/pixel is asked (from the link activation in the email at the recipient) to serve the image/pixel to the email, the server knows the email has then been opened, and the email marketing and email newsletter systems record this activity as fact that the email has been opened.

These image/pixel links in the email are often configured to automatically call back to the server when the email has been opened, making the open detection from the serving of the image/pixel automatic when the email is opened, unless there is a mechanism to block it.

Similar methods are used to track that a link has been clicked (the clicking of the link serves a web page from a server, the server knowing the link has been clicked when asked to serve the web page to the browser of the email receiver.

Knowing promotional email, newsletters, and other email have been opened, and measuring such, permits senders to test whether their recipients are engaging in their content, and which subject lines of email content are more likely to induce engaging based on the percentage of recipients with tracked email opens.

As described above, email list brokers or those selling or renting lists, base the value of their list (financial value) on how engaged the recipients are; and they measure engagement based on email opens.

In both situations, the higher the open percentage, the higher the perceived value of the list, or the higher the perceived value of the email copywriter, in other words, the more engagement measured by opens clicks, or some other parameter, means more money is paid to those that make these email campaigns happen.

In the last few years, and increasing more and more in popularity, due to the risk of malware being injected into companies through links in email, or due to phishing and other threats associated with malicious or impostor links being placed in email, or impostor or malicious web pages being served after links are clicked, email security companies have been offering email security gateway servers that filter all inbound email into a company, and programmatically activate links in each email in a "sandbox", to verify if the links contain malicious elements like impostor or malicious web pages; and once the link is activated and determined to be benign, these emails then pass along into the inbox of the intended recipient. Those of ordinary skill in the field understand that the term "sandbox" refers to a isolated processing in which a link can be opened without injecting malware or other cause harm to the processor or server system in which the sandbox environment has been created.

What this has inadvertently caused is email marketers and email newsletter senders are reporting not only email opens by humans, but also email opens by these "sandbox" servers (non-humans).

By reporting both email opens by humans and by servers, their reports of engagement with their email lists, or the value of the email content they prepared, appears to be higher than it actually is (or would be if measuring only opens or engagement based on human opens).

As is easily understood, there are financial consequences if one does not distinguish human opens from all opens. Due to "sandbox" clicks, and with no way to distinguish human from server clicks/opens, businesses are paying inflated prices for email lists and email campaign creation as they are often charged on a pay-per-click or pay-per-open rate basis; or they pay for what is (incorrectly) measured as higher engagement with their emails.

For example, if one now sends an email to 1000 people, and 100 happen to be in one company with a server that automatically activates the links in the email, all 100 of those recipients in that company will show in the email marketing engagement reports as having opened the email, when it is actually unknown whether a human at the recipient did or did not open the email.

Open tracking and email link click tracking, in the traditional sense, is now broken as the opens that are the traditional methods of measuring engagement are reporting significantly inflated engagement metrics. This is causing financial pain for the list buyers or businesses paying for email promotional or newsletter campaigns. What is needed is a way to identify the human email opens or link clicks; separating out the server, sandbox, or bot clicks/opens. What is needed is a way to bring back the traditional value and confidence in email marketing open tracking metrics.

The present disclosure describes several embodiments that provide a system that employs a singular process or combination of processes to deduce which email open and link clicks tracked using HTTP call back methods were done by only humans.

There are five main embodiments described in this disclosure that can be employed individually or in combination to provide indications or measures of whether an email open and/or link clicks have been performed by a human, or non-human. These various embodiments thus provide a significant improvement over currently known or used systems because the various embodiments of this disclosure provide a system to discriminate between human and non-human opens or link clicks. This discrimination results in significant cost reductions for emailers due to reduced engagement payments and better realization of which emails actually result in increased engagement.

The following describes in general the process of the various embodiments of the present disclosure:

1. Send a Test Message Addressed to a Fictitious Email at the Recipient Domain and Measure Opens. An email system that determines if the recipient domain and/or server IP is one that had previously been detected to have a gateway server that invokes server/sandbox/bot activation of links and if so, does not count initially activated links as human opened links; if not in the known list of server activated link systems at the recipient, then the system sends an email to the domain as a test, that email address being to a fictious user at that domain. If that email is detected as opened—since there is no human at the address—the system then knows that the recipient domain uses servers or sandboxes to activate links and adds the domain/IP address to the list of know domain/IP that use servers or sandboxes to activate links.

Here, there is an "analyzer" that is updating the list of know recipient domains that have server/sandbox/bot link activation, this updating list being used by the system to minimize the need to send fictitious test emails to the multiple recipients within the same domain or repeatedly to recipients after their server/sandbox/bot link activation capabilities are known by the system.

2. Measure the Sent Time Differential from the Open Time. If an email is sent and instantly detected to be opened, this is an indication of non-human activity, as it would be unusual for a human to be able to open an email within seconds of the send time. Servers, however, will do this. If that email is detected as opened within a parameter of time nearness from the sent time, then the system knows that the recipient domain uses servers to activate links and the system then adds the domain/IP address to the list of known domain/IP that use servers to activate links.

Here, there is an "analyzer" that is calculating the sent time and open time differential and measuring that against the set parameter for that domain or for the system, and then making a determination of whether the tracked open is from a server at the recipient or from a human.

3. Record if there is an Open Time and Subsequent Delivery Status Notification of Rejection. If an email is sent and detected to be opened, and subsequently, for example, but not limited to, within 30 minutes, 1 hour, or the like, if the system receives a delivery status notification (DSN) that for example the employee with that email address no longer works at the company, then the system knows that the recipient domain uses servers to activate links, and adds the domain/IP address to the list of know domain/IP that use servers to activate links.

In this case, the "analyzer" of the system holds the initial open track information for a set parameter period of time to wait to see if there is a contradicting DSN returned, or if there are a series of contradicting DSNs returned (for example, a gateway server indicating acceptance (250 OK) or open from a sandbox click, but then the mail server indicating rejection), and then making the determination of whether the initial open detection can be relied upon by the system as a human open.

4. Parse for Human-Only Email Clients or Devices from the HTTP Data Return to the Server at Opening. If an email is sent and detected to be opened, the HTTP data can be captured by the system, which includes data, including IP address where the email was opened, device or program in which the email was opened, and more. If the HTTP data returned to the system server is parsed for key words like "iPhone" or "Microsoft Outlook" then the system knows that that open was a human open (opened by a human in a program that is not a system server/sandbox); and the system then knows with confidence that that recorded open was a human open.

In this case, the "analyzer" parses text content of the HTTP record returned to the sender server, and finds indicators in the text (for example, but not limited to, a parameter such as "HTTP_USER_AGENT", and parses the text within a set parameter of characters after this text indicator, searching for other indicators from a list, such as, for example only, and not limited to "iPhone", "Microsoft Outlook", "Microsoft Office" and the like, and stores the indication as to whether these human open text indicators were found in the HTTP record, and then makes the determination of whether the initial open detection can be relied upon by the system as a human open.

5. Parse HTTP Data Returned to the Server at Opening for IP Address Changes. If an email is sent and detected to be opened, the HTTP data can by captured by the system, which includes data, including IP addresses where the email was opened, and the IP address detected in one opening is different from another open IP address detection and they are measured within a short period of time, or they are not associated with the same ISP, or they are not associated within the same geo-location, the system knows that that the recipients email address may have been hijacked and some of the opens detected at that recipient may not be opens by the intended recipient.

In this case, the "analyzer" that is parsing the text content of the HTTP record returned to the sender server, upon finding indicators in the text related to location, region, associated with the IP addresses, and parsing text within a set parameter of characters after this text indicator from a list (for example, and IP addresses range) and stores the indication as to whether opening has been detected in different geographic IP locations within a parameter timeframe; and then makes the determination of whether the open detections can be relied upon by the system as opened by the intended recipient (as opposed to an email box hijack recipient).

Send a Test Message Addressed to a Fictitious Email at the Recipient Domain and Measure Opens:

The present disclosure takes advantage of the fact that automated systems generating HTTP requests from links embedded in emails are typically operated by systems belonging to different internet IP addresses as compared to the IP address of the destination human user. To practice the disclosure, the sender/sending server, before sending a message to an address in a domain, will send a test message to a fictitious address in that domain with HTML links to a particular web address. Because the address is fictitious, any requests generated from the links embedded in the test message must be from an automated process and not human activity.

Figure 3:
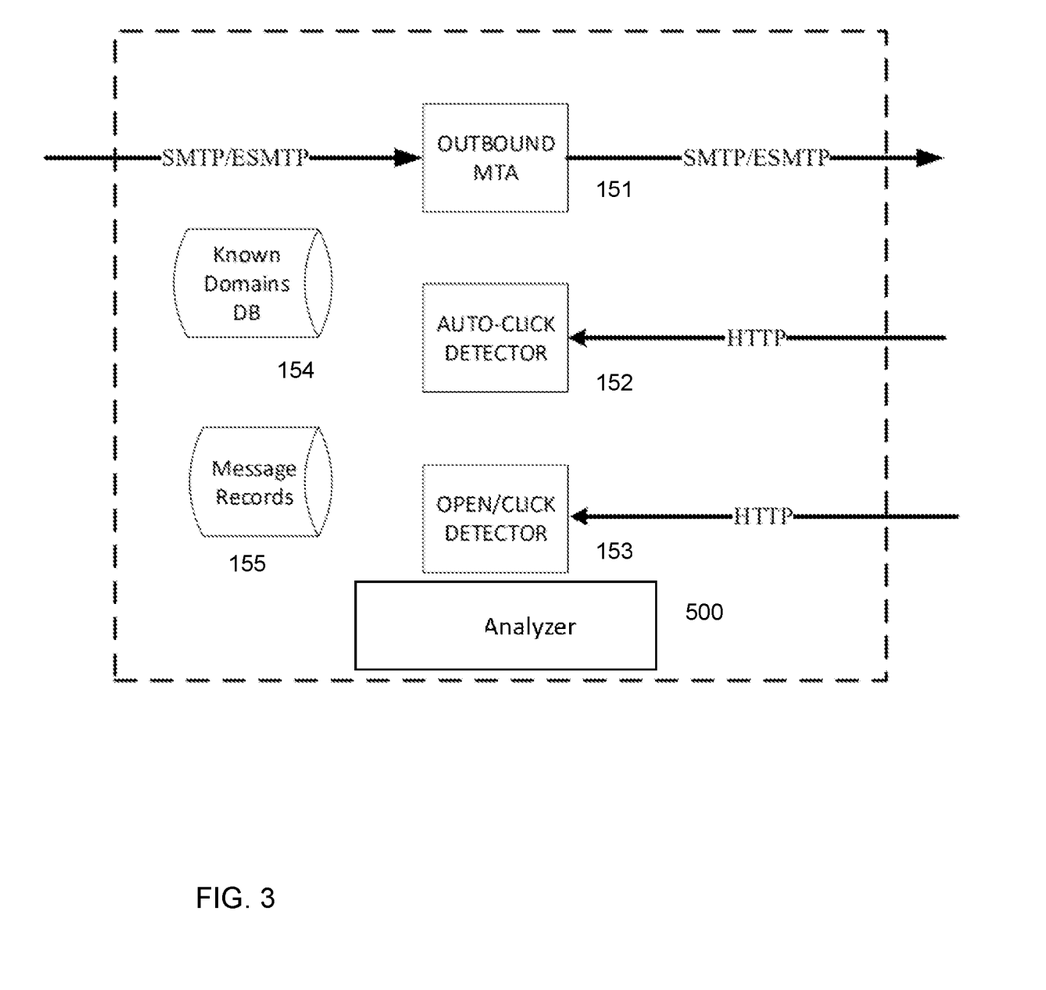
FIG. 3 is a block diagram illustrating the information topology of one embodiment of the present disclosure.

One embodiment of this disclosure is portrayed in FIG. 3 and comprises: an MTA for the transmission of Outbound messages 151, a website/service capable of receiving HTTP requests from external auto-click systems 152, a website/service capable of receiving HTTP requests generated by recipient activity 153, a database recording information correlating domains, IP addresses 154, and a database for recording message data. Also shown in an analyzer in box 500. As will be described in more detail below, the analyzer may perform additional functions in some embodiments of the present disclosure to pre-determine if a received HTTP call out request was originated by a human, or was originated by a bot or other software app. While analyzer 500 is shown, it will be understood that the functions of this box are optional, and may performed at least in part by hardware and/or software commands used to program a processor of the system.

Figure 4:
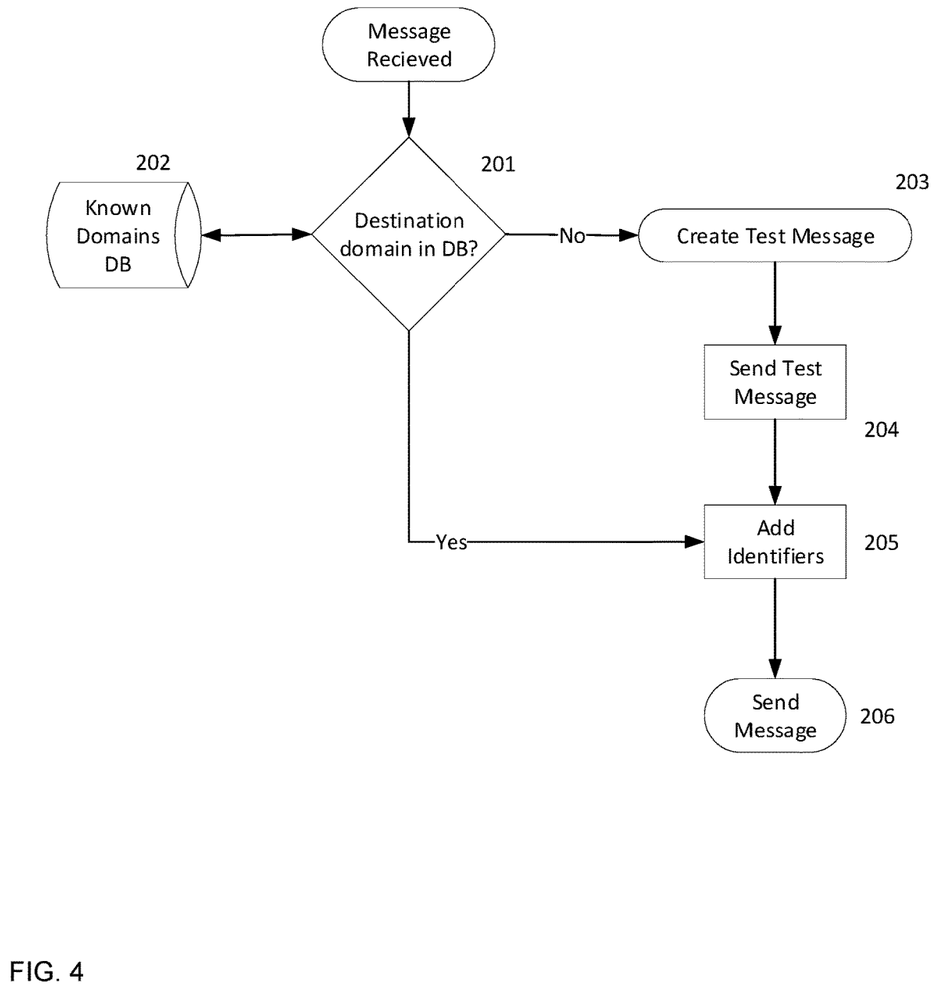
FIG. 4 illustrates one embodiment of a flow chart illustrating one embodiment of the present disclosure.

FIG. 4 depicts a flow chart of activities that take place in one embodiment of the present disclosure. In this embodiment, at the system outbound MTA: On receiving a message for transmission, the sending system first 201 compares each destination address's domain against the Known Domains database 202 to determine whether the MTA has previously transmitted messages to addresses in this domain.

If a destination domain is not in the Known Domains database, the system creates a test message to a fictitious address in the domain. For example, ThisIsAFalseAddress@domain.com. 203. The test message contains an HTML link ("<a href") and an HTML image callout <"img src=" which link to the system's auto-click detecting web site. Each linking element link includes a query string identifying the destination domain. In box 204, a test message is sent to the false address at the destination domain.

Opening links and callouts are added to the original message, each containing a unique identifier of the message and the destination address of the message. If the message is addressed to multiple recipients, multiple copies of the message are created, unique to each destination, and transmitted separately 206.

Figure 5:
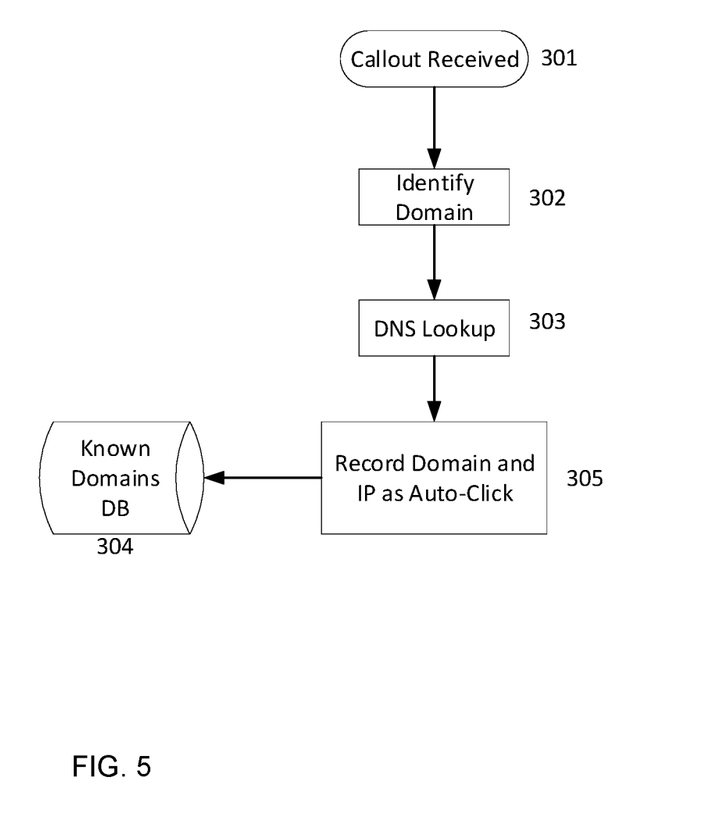
FIG. 5 illustrates one embodiment of a flow chart illustrating an embodiment of the present disclosure.

FIG. 5 is a flow chart depicting an embodiment of a process that may be carried out at the system's Auto-Click detector site: Upon receiving an HTTP signal from an embedded link or call out in a test message 301 the system will determine the domain of the callout by examining the domain identifier embedded in the link. 302. In box 303, the system performs a DNS lookup for the IP addresses associated with the domain. The record of the domain in the Known Domains Data Base 304 is updated to indicate that the domain uses auto-click. The IP records of the associated domain are recorded in the database in box 305.

Figure 6:
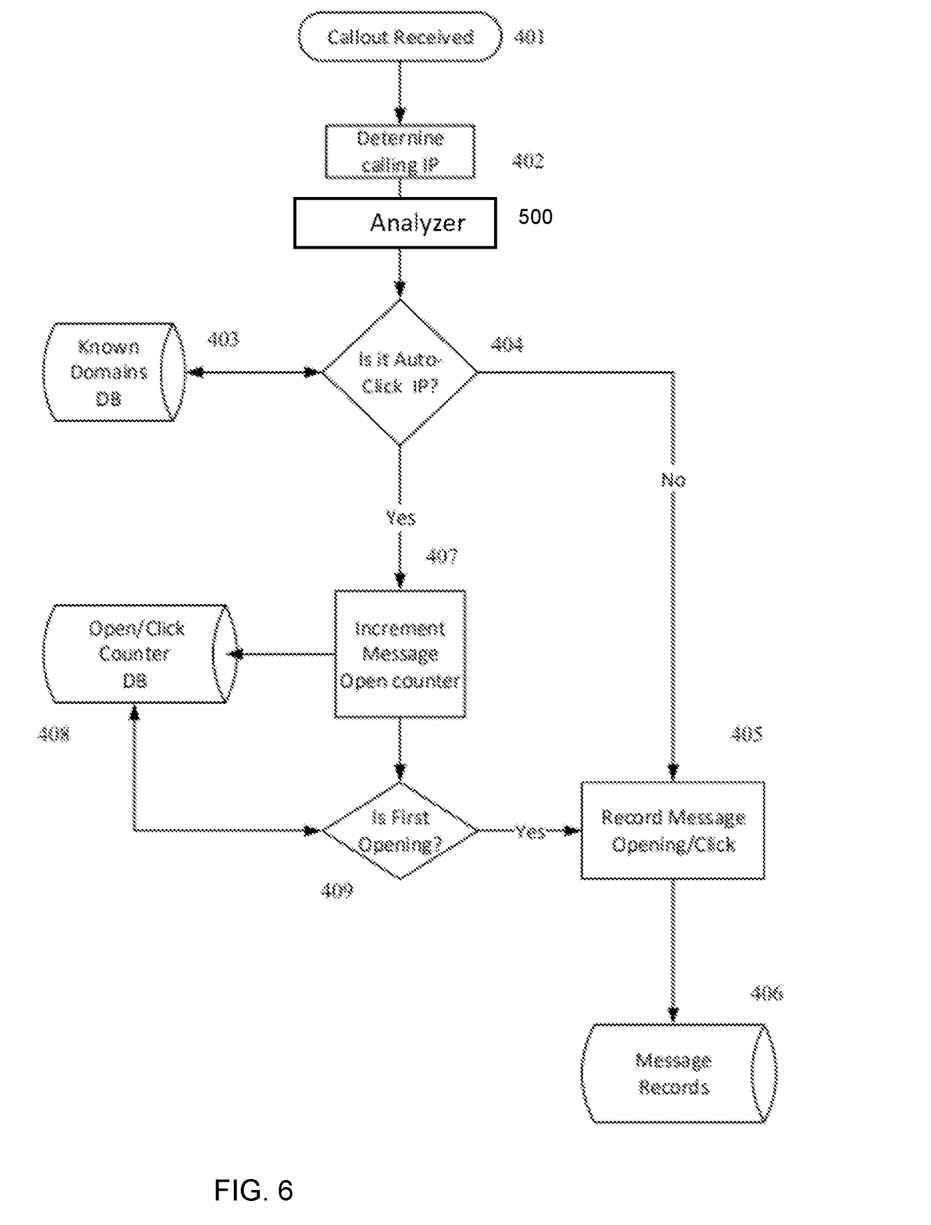
FIG. 6 illustrates one embodiment of a flow chart illustrating an embodiment of the present disclosure.

FIG. 6 is a flow chart depicting an embodiment of a process that may be carried out at the systems Click/Opening detection site: Upon receiving the HTTP request at box 401, the system determines originating IP address of the callout at box 402. At box 404, the system then determines if the IP address of the request is recorded in the Known Domains list of auto-click Ips 403. If the message does not originate with an auto-click domain, the system records 405 a user opening/click event in the system message database.

If the HTTP request originates from an auto-click domain, in box 407 the system determines if a record associated with the message identifier in the request exists in the Open/Click Counter database 408. If such a record does not exist, one is created. If a record does exist, the system records a user opening/click event in the system message database in box 405.

In one embodiment, the disclosure describes a system for identifying HTTP requests generated by user interaction with links embedded in emails from requests generated by automated processes comprising: a system serving as a Mail Transport Agent capable of receiving email messages for transmission to remote destinations, a web server capable of receiving HTTP requests at an internet address, coupled with a database containing a list of Internet Protocol (IP) addresses of automated systems that generate HTTP requests from links included in email messages, at the MTA server, the step of determining the domain of a message's destination address and, before transmitting the message to the destination, creating a test message to a fictitious address in the destination domain and embedding in said message a link to the web server; and transmitting said message to the fictitious address, and the web server, upon receiving HTTP requests, determining the IP address of the originating message and adding that address to the database list of addresses of automated systems generating HTTP requests. In another aspect, at the Web server, after identifying the originating address of an HTTP request, determining the ownership of said IP address and further identifying IP addresses associated with said owner and adding said addresses to the database. While analyzer 500 is shown, it will be understood that the functions of this box are optional, and may performed at least in part by hardware and/or software commands used to program a processor of the system.

In another embodiment, the disclosure describes a method of receiving a message at an MTA server, at the MTA server determining the domain of a message's destination address and, before transmitting the message to the destination, creating a test message to a fictitious address in the destination domain and embedding in said message a link to a web server; and transmitting said message to the fictitious address, and the web server, upon receiving HTTP requests, determining the IP address of the originating message and adding that address to the database list of addresses of automated systems generating HTTP requests. In another aspect, at the Web server, after identifying the originating address of an HTTP request, determining the ownership of said IP address and further identifying IP addresses associated with said owner and adding said addresses to the database.

Figure 7:
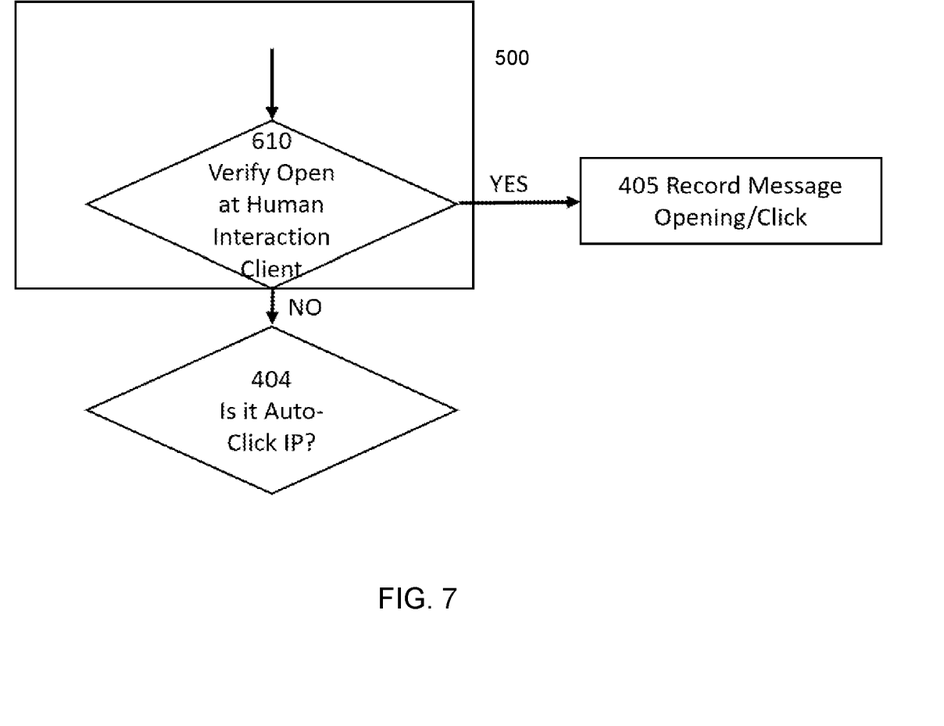
FIG. 7 illustrates one embodiment of a flow chart illustrating an embodiment of an analyzer in accordance with the present disclosure.

FIG. 7 illustrates the process or processes carried out by the processor 500 described previously. When a callout is received, the Analyzer 500, in some embodiments, is included that performs additional functions to pre-determine if a received HTTP call out request originated by a human, including for example, 610 verifying through the HTTP data returned at the server 500 Analyzer whether there are indications that determine human opening. Several non-limiting examples of actions and analysis that may be performed by the analyzer are set forth in the following examples.

Parse for Human-Only Email Clients or Devices from the HTTP Data Return to the Server at Opening:

For example, if the Analyzer as shown in FIG. 6 parses the HTTP data for the term "HTTP_USER_AGENT" and identifies the within a set parameter of characters the term "iPhone", "Microsoft Office", or "Microsoft Outlook" (or other similar click/viewed email client identifiers) then the system would record the message as opened/clicked in box 405 and proceed in the process accordingly.

Example HTTP_USER_AGENT response from human interacted email client at receiver/viewer may result in identifying that response originated from an iPhone if it receives the response.

HTTP_USER_AGENT: Mozilla/5.0 (iPhone; CPU iPhone OS 14_8_1 like Mac OS X) AppleWebKit/605.1.15 (KHTML, like Gecko) Mobile/15E148. Similarly, it may identify that the response originated from a human using MS Office if it receives a response such as HTTP_USER_AGENT: Microsoft Office/16.0 (Microsoft Outlook 16.0.14326; Pro), Mozilla/4.0 (compatible; ms-office; MSOffice rmj).

In one example when the analyzer detects an HTTP_USER_AGENT response from a non-human server triggered open/click, and that it does not include the identifiers for the human interacted email client at the receiver/viewer would be a response such, for example, HTTP_USER_AGENT: Mozilla/5.0 (Windows NT 10.0; Win64; x64) AppleWebKit/537.36 (KHTML, like Gecko) Chrome/79.0.3945.74 Safari/537.36 Edg/79.0.309.43.

A database may be created and updated to include a list of terms and other parameters that the Analyzer inputs into its algorithm to distinguish opens/clicks of humans from servers. For example, other email client indicators that are email clients at devices remote from the server and not mimicked by the server, and the other time-of-opening parameters described herein the present disclosure. This database may be used to provide the analyzer with comparative data that may be used in the analysis of received opens to more quickly and accurately analyze the received opens when the received open is received from a server already listed in the database.

Additional embodiments consider this problem further.

Measure the Sent Time Differential from the Open Time:

With open tracking with the image/pixel in that new security servers at recipients are putting messages received into a special area and then programmatically triggering the links/pixel/images to check to see that the links are not downloading malicious code or leading to malicious websites. The challenge is, in this case, a sending system tracking human opening at the recipient would show message "opened"—which it was—but this is not opened by the intended human recipient but rather a server process at the recipient. Such systems designed to track human opening would like to try to not show "opened" in this situation as it may be confusing to the sender who may claim the message was opened by the human recipient rather than, in this case "at" the recipient system. This is additionally important for tracking for example whether an e-sign request was initiated or aborted based on bot link clicks in an email. An additional embodiment to solve this, is a system that:

1. Records the time (A) of dispatch of the message from the system server to the recipient 2. Detects and records the time (B) the image/pixel/link opening was triggered by when the system server is requested to deliver the image/link data, and 3. Calculates the difference between time (B) and time (A) and if (B) minus (A) is less than X seconds, then the system does NOT report that the message was human opened, otherwise the system DOES report the message human opened.

4. X is configurable—for example, at 10 seconds, but there is a tradeoff based on the value of X so it is intended that it could be set differently when delivering to different recipient domains (ISP domains vs. business domains for example), with an associated look-up database of domains and their associated X value that is accessed prior to the delivery of the message to the recipient.

a. The longer the X time, the more likely a human recipient may actually have been the one to open the message (vs. the system) and then a report of human opening by the recipient may not be recorded when it actually was opened by the recipient b. The shorter the X time, the more likely a recipient SYSTEM may actually have been trigger to open the message (vs. the human) and then the report is human opening by the recipient when it actually was NOT opened by the human recipient c. An example would be X=10 seconds was the best approach generally, but with this value configurable for sender domains depending on how the sender organization perceives the cost/benefit/risk of the tradeoff.

All links referenced herein could be links not configured to automatically extract when opened or links that are auto-clicked by systems at recipients.

Record if there is an Open Time and Subsequent Delivery Status Notification of Rejection:

In another embodiment there is a delay in reporting results to the sender to compare the open detection with what might come later, delivery status notifications. If the server reports a rejection of the message in a DSN after the link was triggered (measuring message opening), the DSN of a rejection should take precedent over the opening detection. The DSN that negatively contradicts the result of opening should take precedent and this detail compared in a database.

Example

Opening after 10 seconds of sending, will be recorded as opened (delivered and opened if after +10 seconds), opening detected in less than 10 seconds from sending, open detection is ignored and process delivery status based on SMTP and/or DSN information, opening detected in less than 10 seconds from sending and DSN information reports delivery rejection/failure, open detection is ignored and process delivery status based on SMTP and/or DSN information with the marked delivery failure.

In an additional embodiment, there are additional delays added before reporting results to sender to accommodate the delays herein associated with waiting for an open detection and DSN auto-reply and auto-submit responses should also take precedence over open detection status.

In another embodiment one could clear the open trigger cache after X-seconds so a follow-up human link click would not contain the record of the initial automated server click. If the link is again triggered later, the human open tracking would still work.

Parse HTTP Data Returned to the Server at Opening for IP Address Changes:

In another embodiment, matching the MX record to verify if the click/IP is the same address of the same MX record of the server if there is a match, and then if there is a later determination of a click/IP address open indication associated with the same message at different times in different locations, determining if the message was opened by more than one server or human at different locations within a time parameter. This can then be used as an indication or indications to determine if a copy of the message was forwarded to a second system via an auto-forwarding rule, which is an indication of receiver account hijacking.

And, in another embodiment, determine that the opening was likely security server causing the open detection:
  If multiple recipients in the same domain open detected within the same few seconds
  If recipients open/click on multiple links in any email within the same few seconds
  If recipients click on every (or most) links in an email
  If multiple recipients in domain have similar click patterns (meaning, they are clicking/opening email in approximately the same patterns.

One may implement one of the above embodiments or several of them or variations, and one may assign a value to each embodiment and determine if the report should detect opening based on the sum of the scores exceeding a threshold of acceptable assurance/risk of accurate reporting, and the score to exceed may vary depending on the criticality of an accurate report of opening to the business/sender.

While particular embodiments of the present disclosure have been described, it is understood that various different modifications within the scope and spirit of the disclosure are possible. The disclosure is limited only by the scope of the appended claims.

We claim:

1. A system for identifying HTTP requests generated by user interaction with links embedded in emails from HTTP requests generated by automated processes comprising:
  a system having a processor, the processor programmed using hardware and software commands to provide services to other programs running on the processor;
  a memory in operable communication with the processor;
  a Mail Transfer Agent (MTA) running on the processor, the MTA configured for receiving email messages from senders for the transmission of Outbound messages to remote destinations;
  a first website/service running on the processor, the website/service configured to receive HTTP requests from external auto-click systems;
  a second website/service running on the processor, which may be the same as the first website/service, the second website/service configured to receive HTTP requests generated by recipient activity;
  a database for recording information correlating domains, IP addresses;
  a database for recording message data;
  a Known Domains database;
  wherein on receiving a message from a sender for transmission, the sending system first analyzes the received message and compares each destination address' domain of the received message against the Known Domains database to determine whether the MTA has previously transmitted messages to addresses in the domain of the received message, and
  If at least one of the destination domains of the received message is not in the Known Domains database, the processor creates a test message to a fictitious address in the domain;
  wherein the test message contains an HTML link and an HTML image callout which link to the first website/service, each HTML including a query string identifying the destination domain, links and callouts added to the original message;
  wherein the processor transmits the test message to the fictitious address;
  wherein, upon receiving an HTTP signal from an embedded link or call out in the test message, the first website/service determines the domain of the callout by examining the domain identifier embedded in the link; and
  wherein a record stored for the domain in the Known Domains data base is updated to indicate that the domain of the recipient of the test message uses auto-click.

2. The system of claim 1, wherein the processor of the first website/service identifies an originating address of the HTTP request generated by automated actuation of the link, the processor adds an indication in a report for a future email sent to that domain, the indication being associated with information about that domain is using automated systems to activate links.

3. A system for receiving a message at an MTA Mail Transfer Agent (MTA) server, comprising:
  a processor located at the MTA server, the processor programmed using hardware and/or and software programming commands to receive a message and determine an originating address of the received message and determine a domain of the received message's destination address;
  a memory in electronic communication with the processor;
  wherein, before transmitting the message to the received message's destination address, the processor creates a test message to a fictitious address in the domain of the message's destination address, embeds a link to a website/service in the message, and transmits the test message to the fictitious address; and
  wherein the processor at the website/service, upon receiving an HTTP requests for the fictitious address, determines a domain and/or IP address of the original message destination address, and adds that domain and/or IP address to a Known Domains database in the memory, the Known Domains database comprising a list of domain and/or IP addresses of automated systems generating HTTP requests.

4. The system of claim 3, further comprising:
  after identifying the original destination address of the HTTP request, the processor of the website/service determines an owner of the domain and/or IP address and further associates the domain and/or IP addresses with the owner and adds those addresses to the Known Domains database.

5. A system for identifying HTTP requests generated by user interaction with links embedded in emails from requests generated by automated processes comprising:
- a processor remote from a sender of an email message, the processor programmed using hardware and/or software commands, the processor configured as a Mail Transport Agent (MTA) capable of receiving email messages from the sender for transmission to one or more recipient destinations remote from the sender and the processor, the one or more recipient destinations having a destination domain,
- the processor also programmed using hardware and/or and software commands to create a test message to a fictitious address in the destination domain and to embed a link to a web server in the test message and to transmit the test message to the fictitious address;
- a memory in electronic communication with the processor; and
- a web server running on the processor, the web server capable of receiving an HTTP request, the web server including an analyzer configured to analyze an HTTP request received from the link activated when the test message is received at the fictitious address,
- and if the link was activated from the test message, recording in a database stored in the memory that the domain associated with the fictitious address uses non-human tools to activate the link.

6. The system of claim 5, wherein the indicators are in the HTTP records and include information identifying email clients at the recipient.

7. The system of claim 5, wherein the analyzer measures time sequence of information the analyzer receives related to the HTTP request.

8. The system of claim 7, wherein the analyzer makes a determination that the HTTP request was not initiated by a human using information related to difference between the time of sending the HTTP request resulting when the link in the test message is actuated at a recipient domain, and a time of receiving the HTTP request information, and a minimum permitted difference parameter.

9. The system of claim 7, wherein the analyzer further determines if subsequent information is returned to the web server that indicates that the HTTP request was initiated by a server associated with the recipient destination.

10. The system of claim 5, wherein the analyzer displays the analyzer's determination in a report.

11. The system of claim 10, wherein the report is authenticatable.

12. The system of claim 11, wherein the report is made accessible to the message sender.

13. The system of claim 5, wherein the analyzer matches an MX record in the database to verify if a click/IP is associated with the MX record in the database.

14. The system of claim 13, wherein the analyzer further determines if there is an additional click/IP record at a different location and records the determination in a database associated with the analyzer.

15. The system of claim 14, wherein the analyzer displays the analyzer's determination in a report.

* * * * *